(12) United States Patent
Shvarzman

(10) Patent No.: US 10,745,324 B2
(45) Date of Patent: Aug. 18, 2020

(54) DECORATIVE CONCRETE TOPPING PROCESS

(71) Applicant: ACM Technologies Inc., Winnipeg (CA)

(72) Inventor: Asia Shvarzman, Winnipeg (CA)

(73) Assignee: SKARB Holdings Inc., Winnipeg, Manitoba (CA)

( * ) Notice: Subject to any disclaimer, the term of this patent is extended or adjusted under 35 U.S.C. 154(b) by 174 days.

(21) Appl. No.: 15/947,158

(22) Filed: Apr. 6, 2018

(65) Prior Publication Data

US 2019/0106358 A1    Apr. 11, 2019

Related U.S. Application Data

(60) Provisional application No. 62/621,303, filed on Jan. 24, 2018, provisional application No. 62/483,660, filed on Apr. 10, 2017.

(51) Int. Cl.

| | | |
|---|---|---|
| *C04B 28/04* | (2006.01) | |
| *C04B 18/24* | (2006.01) | |
| *C04B 16/06* | (2006.01) | |
| *C04B 14/38* | (2006.01) | |
| *C04B 24/08* | (2006.01) | |
| *C04B 24/36* | (2006.01) | |
| *C04B 24/32* | (2006.01) | |
| *C04B 24/02* | (2006.01) | |
| *C04B 24/04* | (2006.01) | |
| *C04B 22/16* | (2006.01) | |
| *C04B 14/42* | (2006.01) | |
| C04B 111/00 | (2006.01) | |
| C04B 103/30 | (2006.01) | |
| C04B 103/46 | (2006.01) | |
| C04B 111/34 | (2006.01) | |
| C04B 111/60 | (2006.01) | |

(52) U.S. Cl.
CPC ............ *C04B 28/04* (2013.01); *C04B 14/386* (2013.01); *C04B 14/42* (2013.01); *C04B 16/065* (2013.01); *C04B 16/0625* (2013.01); *C04B 16/0641* (2013.01); *C04B 16/0683* (2013.01); *C04B 16/0691* (2013.01); *C04B 18/248* (2013.01); *C04B 22/16* (2013.01); *C04B 24/02* (2013.01); *C04B 24/04* (2013.01); *C04B 24/085* (2013.01); *C04B 24/32* (2013.01); *C04B 24/36* (2013.01); *C04B 2103/302* (2013.01); *C04B 2103/46* (2013.01); *C04B 2111/00482* (2013.01); *C04B 2111/34* (2013.01); *C04B 2111/60* (2013.01)

(58) Field of Classification Search
None
See application file for complete search history.

(56) References Cited

U.S. PATENT DOCUMENTS

| | | | | |
|---|---|---|---|---|
| 2,155,571 | A * | 4/1939 | Tullis .................... | E01C 19/44 15/235.8 |
| 3,246,057 | A * | 4/1966 | Simonson .............. | C09J 163/00 264/35 |
| 4,640,715 | A * | 2/1987 | Heitzmann ........... | C04B 28/006 106/706 |
| 5,424,099 | A * | 6/1995 | Stewart ................. | C04B 28/146 106/695 |
| 5,439,518 | A * | 8/1995 | Francis .................. | C04B 28/14 106/705 |
| 6,898,917 | B2 * | 5/2005 | Durning ................. | B32B 13/04 106/802 |
| 2010/0089293 | A1 * | 4/2010 | Guynn ................... | C04B 28/02 106/709 |

* cited by examiner

*Primary Examiner* — Nathan T Leong
(74) *Attorney, Agent, or Firm* — Michael R. Williams; Ryan W. Dupuis; Ade & Company Inc.

(57) ABSTRACT

Described herein is a method for preparing decorative concrete top ping which overcomes the limitations associated with epoxy Terrazzo floors. Specifically, the decorative concrete topping mixture described herein has a low crack potential, high strength and durability, much longer working time, thereby allowing for the material to be mixed in larger quantities and simplifying application. A binder composition made of Portland cement and pozzolanic materials is mixed with an decorative aggregate and other additives before pumping the concrete topping mixture onto a subfloor and allowing the concrete topping mixture to cure.

23 Claims, No Drawings

DECORATIVE CONCRETE TOPPING PROCESS

PRIOR APPLICATION INFORMATION

The instant application claims the benefit of U.S. Provisional Patent Application 62/621,303, filed Jan. 24, 2018, entitled "DECORATIVE CONCRETE TOPPING PROCESS", the contents of which are incorporated herein by reference.

The instant application also claims the benefit of U.S. Provisional Patent Application 62/483,660, filed Apr. 10, 2017, entitled "DECORATIVE CONCRETE TOPPING PROCESS", the contents of which are incorporated herein by reference.

BACKGROUND OF THE INVENTION

Terrazzo is a composite material that is used for floor and wall treatments.

The Terrazzo mix typically comprises chips of marble, quartz, granite, glass or other suitable materials.

Terrazzo epoxy floors are applied as a two component epoxy resin combined with the desired decorative aggregate. This mixture is applied to a subfloor that has been prepared and primed. Metal strips are used to divide sections of the floor but also act as control and expansion joints to prevent the terrazzo topping from cracking due to joint movement.

The epoxy terrazzo is virtually indestructible and is chemical-resistant and stain-resistant but not UV stable. Furthermore, once the epoxy is mixed with the decorative aggregate, it must be placed without delay as the mixture has a working time of only 45-60 minutes. Consequently, mixing is done only in small batches and if applied to a large area, the large area must be divided into smaller segments and each segment prepared separately.

Furthermore, the material is non-breathable and therefore traps moisture vapor coming up from the concrete slab to which it is applied.

Consequently, installation is costly due to the labor and skill level involved in the proper installation thereof.

SUMMARY OF THE INVENTION

According to an aspect of the invention, there is provided a method of applying a decorative concrete topping to a subfloor comprising:
preparing a binder composition comprising: about 25-90% (w/w) Portland cement; and about 10-75% (w/w) pozzolanic materials;
adding to the binder composition:
  (i) an aggregate added at about 50-85% (w/w) of the binder;
  (ii) a high range water reducing additive at about 0.5-5% (w/w) of the binder;
  (iii) a hydration stabilizer at about 0.01-0.1% (w/w) of the binder;
  (iv) a shrinkage reducer at about 0.1-7.5% (w/w) of the binder; and
  (v) fiber at 0.1-2.0% (w/w) of the binder; and
mixing the concrete topping mixture;
preparing a subfloor for installation of the decorative concrete topping;
pumping the concrete topping mixture onto the subfloor; and
allowing the concrete topping mixture to cure, thereby producing a decorative concrete topping.

According to another aspect of the invention, there is provided a method of preparing a decorative concrete topping comprising:
preparing a binder composition comprising: about 25-90% (w/w) Portland cement; and about 10-75% (w/w) pozzolanic materials;
adding to the binder composition:
  (i) an aggregate added at about 50-85% (w/w) of the binder;
  (ii) a high range water reducing additive at about 0.5-5% (w/w) of the binder;
  (iii) a hydration stabilizer at about 0.01-0.1% (w/w) of the binder;
  (iv) a shrinkage reducer at about 0.1-7.5% (w/w) of the binder; and
  (v) fiber at about 0.1-2.0% (w/w) of the binder.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As will be known by those of skill in the art, cement based terrazzo has fallen out of favor due to the slow curing time, high crack potential, high labour costs and shortening of construction schedules. While epoxy resins replaced cement, the higher cost of this epoxy based product, the lengthy labour intensive application process and environmental concerns started to become an issue.

However, described herein is a low cost compelling product that will revive the terrazzo industry.

Described herein is a method for preparing decorative concrete topping which overcomes the limitations associated with epoxy Terrazzo floors. Specifically, the decorative concrete topping mixture described herein has a low crack potential, high strength and durability, and much longer working time, thereby allowing for the material to be mixed in larger quantities and simplifying application thereof, as discussed herein. Furthermore, because the material comprises concrete but no epoxy, no vapor barrier is required.

The decorative concrete topping, referred to herein as "REAZZO™" (epoxy-free decorative concrete topping) is a high performance, self-compacting, fiber reinforced, low-shrinkage decorative polished concrete microtopping.

As will be apparent to one of skill in the art, the decorative concrete topping has a minimum thickness of for example approximately a half inch. While there is no upper limit on the thickness of the decorative concrete topping, in practical terms, the maximum thickness of the micro-topping is approximately equal to the size or diameter of the largest aggregate used, as discussed herein.

The decorative concrete topping comprises: binder, aggregates, chemical and mineral additives, and fiber for reinforcement.

As will be known to one of skill in the art, mineral additives include for example but are by no means limited to pozzolanic materials and hydraulic material other than Portland cement. Specific examples include but are by no means limited to silica fume, fly ash, slag, biomass ash, powder limestone, and metakaolin.

Nanosized mineral additives include for example but are by no means limited to nanosilica, nano-$CaCO_3$, and nano-metakaolin.

As will be appreciated by one of skill in the art, the activity of any additive can be considered to be a combination of the chemical activity or pozzolanic activity of the additive and the physical activity or effect of the additive on the mixture, for example, a microfiller effect.

Mineral additives have different chemical, mineralogical and phase composition. For example, the amorphous phase content, the Si to Al ratio, the particle size distribution and particle shape of the mineral additives are all factors that influence the impact of the specific mineral additives on the mix and on the end product, as discussed herein. That is, based on knowledge of the chemistry of cement and the activity of additive or additives blend, a reazzo concrete mixture having the desired properties can be prepared.

As discussed herein, additional chemical additives can be added to the blend to achieve desired properties, for example but by no means limited to high range water reducing additives, hydration stabilizer, defoamers and shrinkage reducing additives.

Specifically, high range water reducers, also known as super-plasticizers are generally polymers used as dispersants to avoid particle segregation.

Hydration stabilizers are used to control set times.

Defoamers permit a stable admixture formation and help achieve a controllable level of entrained air in a concrete mix.

Shrinkage reducing additives or a shrinkage reducing admixture promotes expansion of the concrete at about the same volume that normal drying shrinkage contracts it.

It is of note that these additives are well-known in the concrete industry.

A permeability reducing admixture may be composed of a) hydrophobic or water repellent chemicals (materials based on soaps and long chain fatty acid derivatives, oils, petroleum derivatives); or b) crystalline hydrophilic polymers.

By combination of mineral additives and shrinkage reducing admixture, we are able to produce a decorative concrete topping with dry shrinkage less than 0.01% at 28 days.

For example, polycarboxylates or the like may be used as high range water reducing additives although other suitable high range water reducing additives will be known to those of skill in the art and/or easily determined by routine experimentation.

Carboxylic acids and phosphorus-containing acid salts or the like may be used as additives for set retarding.

Polyoxyalkylen alkyl ether, propylene glycol or the like may be used for extended set control.

As will be known by those of skill in the art, extended set control admixtures or agents are used to stop or severely retard the cement hydration process in unhardened concrete. Extended set control admixtures differ from conventional set controlling admixture in that they stop the hydration process of both the silicate and aluminate phase in Portland cement hydration. Regular set controlling admixtures act only on silicate phase.

Long chain fatty acid derivatives, petroleum derivatives, crystalline hydrophilic polymers, nano particle filler or the like may be used for shrinkage reduction. For example, a shrinkage reducing admixture may include for example but by no means limited to polyoxyalkylene alkyl ether, polypropelene and polyethylene glycols, glycols ether derivate, combined magnesium oxide and glycol ether, combined Ethyl dioxane methanol and amorphous silica. Specifically, the shrinkage reducing agents efficiently delayed the development of capillary pressure on the concave surface, and lessen the shrinkage cracking of concrete at the plastic stage. The utilization of low temperature and spherical shape cement can properly reduce autogenous shrinkage. Appropriate contents of fly ash can inhibit autogenous shrinkage of concrete.

Polypropylene or the like may be used for air detraining. As will be apparent to one of skill in the art, other suitable compositions for concrete defoaming are well known and may be used within the invention. The introduction of a ntifoaming admixture reduces air in concrete, make the microstructure more dense. Suitable antifoaming agents include but are by no means limited to tributyl phosphate, dibutyl phosphate, dibutylphthlate, polydimethylsiloxane and the like.

Iron oxide and/or titanium dioxide or the like may be used for coloring of the mixture.

For example, the binder may comprise about 25 to about 90% Portland cement and about 10 to about 75% pozzolanic materials and/or alternative cementitious materials. Suitable pozzolanic materials and/or alternative cementitious materials will be readily apparent to one of skill in the art but may include but are by no means necessarily limited to fly ash type F, fly ash type C, biomass ash, silica fume, ground powder glass, slag, metakaolin, calcinated clays and the like.

As will be appreciated by one of skill in the art, the addition of the fibers improves the strength of the decorative concrete topping, prevents cracking and promotes self-leveling of the topping, as discussed herein. Accordingly, many factors are involved in determining the proper fiber concentration, for example, the type of materials being used, the geometry of the topping being applied, and the aspect ratio. For example, in some embodiments, cellulose fiber is used at 3.5 kg per $m^3$ of the topping.

As discussed herein, the fibers may be added in some embodiments at about 0.1% to about 2.0% by volume (w/v) of the total mixture or in other embodiments at about 0.1% to about 2.0% by weight of the binder (w/w). The specific amount will depend on several factors, including on the type of fibers used. For example, for low modulus synthetic fibers it may be about 0.1-0.7% by volume, whereas for high modulus fibers, it may be about 0.75-2% by volume. The aspect ratio (ratio length to diameter), fiber strength, stiffness, and the ability of the fibers to bond with the concrete are important considerations when selecting the proper fiber(s) and amounts thereof to convey reinforcement properties to the decorative concrete topping.

For example, cellulose fiber is natural polymer consisting of D-anhydro-glucose (C6H11O5) repeating units joined by β-1, 4-glycosidic linkages. The reinforcing effectiveness of cellular fiber is a function of the nature of cellulose and its crystallinity. While the cellulose fibers have not effect on drying shrinkage, they are effective in mitigating drying shrinkage-induced cracking. However, the cellulose fibers have internal curing capabilities and significantly inhibited the cracks caused by autogenous shrinkage.

Thus, the combination of the shrinkage reducing admixture, cellulose fibers, and supplementary cementitious materials provide significant reduction in shrinkage cracking. As will be appreciated by one of skill in the art and as discussed above, a wide variety of chemical admixtures or chemical additives may be added, depending on the nature of the decorative concrete topping and the desired effect of the chemical additive.

For example, the "nature" of the decorative concrete topping may depend on many factors, for example, the location thereof, for example, indoors, outdoors, whether in a high foot traffic area or not, exposure to the elements and the like.

For example, the chemical additives may reduce the amount of water present in the decorative concrete topping; may extend or reduce the time required for the decorative concrete topping material to set; may reduce or increase the ability to manipulate the material during setting; may reduce shrinkage of the material during setting; may reduce or increase the permeability of the mixture; may alter the color of the material; and may reduce the air content of the mixture.

As will be appreciated by one of skill in the art, a wide variety of chemical additives known in the art may be used within the invention and are within the scope of the invention. The following list is intended only to be examples of some suitable additives for illustrative purposes and is not necessarily intended to be limiting. It is noted that other suitable additives as well as additives having other desirable effects will be readily apparent to one of skill in the art and/or can be readily determined through routine experimentation.

As discussed herein, additional chemical additives can be added to the blend to achieve desired properties. This additives include for example but by no means limited to high range water reducing additives, hydration stabilizers, defoamers and shrinkage reducing additives, as discussed herein.

As discussed herein, the combination of mineral additives and shrinkage reducing admixture produces a decorative receive concrete topping with dry shrinkage of less than 0.01% at 28 days.

As discussed herein, a wide variety of materials may be used as aggregates within the invention. For example, in addition to marble, quartz, granite and glass, other materials such as porcelain, brick and the like can be combined with cement as discussed herein. As such, suitable aggregates may fall within three broad general classes: natural aggregates, decorative aggregates and recycled aggregates. Furthermore, the aggregates may be ground to any suitable size, for example, as a fine grind, a medium grind or a coarse grind. For example, as discussed above, the coarse grind may be such that a majority of the aggregate particles have a diameter of approximately a half inch. It is also of note that combinations of different types of aggregates as well as different sizes of aggregates may be used in an aggregate mix within the invention. It is also important to note that natural and recycled aggregates, in fact all aggregates, may be considered to be decorative aggregates.

As discussed herein, aggregate is added to the binder at about 50 to about 85%. As discussed herein, the coarse aggregate may be any suitable material desired to be used for a decorative effect. Furthermore, as discussed herein, the coarse aggregate may be of a diameter that is the same as the thickness of the decorative concrete topping, as discussed herein.

The fibers may be selected from natural fibers such as cellulose fibers or biofibers such as hemp, flax, straw, flax shive and flax mulch; synthetic fibers such as acrylic fibers, aramid fibers, carbon fibers, nylon fibers, polyester fibers, polyethylene fibers, and polypropylene fibers, polyvinyl alcohol fibers, and the like; glass fibers and recycled fibers.

In preferred embodiments, the cement is displaced by as much as 50% with natural and recycled pozzolans.

As will be known to one of skill in the art, mineral additives include for example but are by no means limited to Pozzolanic materials and hydraulic material other than Portland cement. Specific examples include but are by no means limited to silica fume, fly ash, slag, biomass ash, powder limestone, and metakaoline.

Nanosized mineral additives include for example but are by no means limited to nanosilica, nano-$CaCO_3$, and nano-metakaolin.

As will be appreciated by one of skill in the art, the activity of an additive can be considered to be a combination of the chemical activity or pozzolanic activity of the additive and the physical activity or effect of the additive on the mixture, for example, a microfiller effect.

Mineral additives have different chemical, mineralogical and phase composition. For example, the amorphous phase content, the Si to Al ratio, the particle size distribution and the particle shape of the mineral additives are all main factors that influence the impact of the specific mineral additives on the end product, as discussed herein. That is, based on knowledge of the chemistry of cement and the activity of additive or additive blend, a decorative concrete topping mixture having the desired properties is prepared.

As will be appreciated by one of skill in the art, any suitable decorative additives may be used, similar to those currently used with epoxy Terrazzo floors. For example, in addition to marble, quartz, granite and glass, other materials such as porcelain, brick and the like can be combined with cement as discussed herein and poured, creating a Terrazzo-like coating that overcomes the limitations associated with the epoxy Terrazzo coatings.

As will be apparent to those knowledgeable in the art of cement and epoxy floors, cement terrazzo floors fell out of favor because of the lengthy time periods required for the material to be mixed and for the floor to be installed and cured. Because of this, epoxy floors were developed which had the advantages of quicker curing, more consistent properties and being available in a variety of colors. However, epoxy floors have a very short open time and as such can only be prepared and poured in small batches. As discussed above, for installation of a large epoxy floor, the installation area must be segregated into multiple zones and each zone poured individually. Furthermore, both methods were limited to using aggregates that were ground to an approximate diameter of about one third of the thickness of the floor being poured.

As discussed herein, the inventor has discovered a method for manipulating the open time of the decorative concrete topping so that, unlike epoxy floors, much larger floors can be installed from a single mixture but without the long and sometimes unpredictable curing times associated with cement floors.

Furthermore, the aggregate particles can be of a much larger size, for example, of the same approximate diameter as the thickness of the decorative concrete topping, for example about a half inch. As will be appreciated by one of skill in the art, this reduces the cost of preparing the aggregate as less grinding is required. Furthermore, larger aggregate particles provide a significantly different decorative effect.

Furthermore, this process allows for the utilization of materials from construction waste that would otherwise be discarded into landfill.

As discussed herein, the decorative concrete topping has the significant advantage of being delivered by a concrete truck and as such does not need to be mixed in small batches on site. Furthermore, the decorative concrete topping can be placed onto the desired surface using traditional concrete pumping methods.

According to an aspect of the invention, there is provided a method of applying a decorative concrete topping to a subfloor comprising:

preparing a binder composition comprising: about 25-90% (w/w) Portland cement; and about 10-75% (w/w) pozzolanic materials;

adding to the binder composition:
(i) an aggregate added at about 50-85% (w/w) of the binder;
(ii) a high range water reducing additive at about 0.5-5% (w/w) of the binder;
(iii) a hydration stabilizer at about 0.01-0.1% (w/w) of the binder;
(iv) a shrinkage reducer at about 0.1-7.5% (w/w) of the binder; and
(v) fiber at about 0.1-2.0% (w/w) of the binder; and
mixing the concrete topping mixture;

preparing a subfloor for installation of the decorative concrete topping;

pumping the concrete topping mixture onto the subfloor; and allowing the concrete topping mixture to cure, thereby producing a decorative concrete topping.

In some embodiments, at least half of the aggregate is a coarse aggregate. In some embodiments, the approximate diameter of at least some of the coarse aggregate is about half an inch.

According to another aspect of the invention, there is provided a method of preparing a decorative concrete topping comprising:

preparing a binder composition comprising: about 25-90% (w/w) Portland cement; and about 10-75% (w/w) pozzolanic materials;

adding to the binder composition:
(i) an aggregate added at about 50-85% (w/w) of the binder;
(ii) a high range water reducing additive at about 0.5-5% (w/w) of the binder;
(iii) a hydration stabilizer at about 0.01-0.1% (w/w) of the binder;
(iv) a shrinkage reducer at about 0.1-7.5% (w/w) of the binder; and
(v) fiber at about 0.1-2.0% (w/w) of the binder.

In some embodiments, as discussed herein, the pozzolanic materials are selected from the group consisting of: fly ash type F, fly ash type C, biomass ash, silica fume, ground powder glass, slag, metakaolin, calcinated clays, nanosilica, nano-CaCO3, nano-metakaolin and mixtures thereof.

In some embodiments, about 0.1-60% of the 10-75% of the pozzolanic matierals may be metakaolin. That is, in some embodiments, the binder comprises about 25-90% (w/w) Portland cement, about 0.1-60% metakaolin and about 9.9-74.9% other pozzolanic materials, that is, non-metakaolin pozzolanic materials, for example: fly ash type F, fly ash type C, biomass ash, silica fume, ground powder glass, slag, calcinated clays, nanosilica, nano-CaCO3, and mixtures thereof.

In some embodiments, the fibers are selected from the group consisting of biofibers; cellulose fibers; glass fibers; synthetic fibers; and combinations thereof.

The biofibers may for example hemp, flax, straw, flax shive and flax mulch.

The synthetic fibers may be selected from for example acrylic fibers, aramid fibers, carbon fibers, nylon fibers, polyester fibers, polyethylene fibers, polyvinyl alcohol fibers, fiber reinforced polymers, and recycled fibers.

In some embodiments, the high range water reducing additive is a polycarboxylate.

In some embodiments, the defoamer is a polypropylene.

In some embodiments, the shrinking reducing additive is selected from the group consisting of: a long chain fatty acid derivative, a petroleum derivative, a crystalline hydrophilic polymer, a nano-particle filler and mixtures thereof.

In some embodiments, the hydration stabilizer is selected from the group consisting of: polyoxyalkylen alkyl ether, propylene glycol, a carboxylic acid, a phosphorus-containing acid salt and mixtures thereof.

In some embodiments, the concrete topping mixture is applied to the subfloor at a thickness of at least half an inch.

In some embodiments, the subfloor is in a location where ambient temperature is between 5 C and 35 C (42 F and 95 F) for at least 48 hours prior to installation of the decorative concrete topping.

In some embodiments, the subfloor is prepared by priming the subfloor.

In some embodiments, the subfloor is primed by applying a suitable bonding agent to the subfloor.

In some embodiments, prior to curing, the concrete topping mixture is channel-floated to smooth a surface of the decorative concrete topping.

In some embodiments, following curing, the decorative concrete topping is ground, grouted and polished.

As discussed herein, the decorative concrete topping can be applied to any suitable subfloor, that is, any properly prepared, sound, dimensionally stable, fully cured concrete at least 28 days old.

In this process, the subfloor is cleaned and prepared for application of the decorative concrete topping using any suitable means known in the art of the preparation of concrete topping.

In some embodiments, a mechanical profile of the concrete surface or subfloor to which the decorative concrete topping is to be applied may be performed. For example, with reference ICRI, concrete surface profile (CSP) #3 to #5 standards for acceptable profile height for interior applications and ICRI CSP #5 to #7 standards for exterior applications.

In some embodiments, the concrete substrate or subfloor is in a location where ambient room temperatures are between 42° F. and 95° F. (5° C. and 35° C.) before application. Furthermore, the temperature must be maintained within this range for at least 48 hours after the installation of decorative concrete topping.

Furthermore, all existing expansion joints, isolation joints, construction joints and control joints, as well as any moving cracks, must be honored up through the topping.

Once the subfloor has been cleaned, a suitable primer, such as those used for the preparation of concrete topping floors is applied to the subfloor. The primer can be any suitable bonding agent known in the art which meets the requirements of ASTM C881.

The selected mixture is prepared for application to the subfloor. As discussed herein, the material of the invention has a working time of 3-8 hours, depending on the selected mixture. Because of this, the material can be prepared in much larger quantities. Furthermore, rather than needing to be prepared on site, the material can be prepared at one processing location and then transported to the application site, for example, in a cement mixer truck. Furthermore, once at the site, the mixture can be unloaded into a concrete pump and pumped into place.

Once applied, the product is screeded with a gauged rake to a predetermined thickness, for example, one half inch, and channel-floated to smooth the surface.

Following application of the topping to the sub-floor, the material is allowed to cure for approximately 16 hours.

Once the topping has cured, the topping is ground using means similar to those known in the art of epoxy Terrazzo floors. Following grinding, grouting and polishing steps are carried out which are also similar to those known in the art of epoxy Terrazzo topping preparation.

As discussed above, the components of the mix can be varied so that the material remains adjustable for 3-8 hours. Furthermore, the mix of the invention has the added benefit of promoting self-leveling of the material as it is applied.

Consequently, much larger applications can be managed with much less labor. Furthermore, as a result of the self-levelling property, less skill is required during the application process. However, despite these improvements to the process, the decorative concrete topping described herein has similar strength and durability compared to the epoxy Terrazzo coatings.

The invention will now be further elaborated by way of examples. However, the invention is not necessarily limited by or to the examples.

During a remodelling project, we had self-imposed a mandate to divert 100% of the construction waste from landfill. Brainstorming on how we could accomplish this, we came up with a plan to process some of the waste into aggregate that could be used in a terrazzo flooring for the new offices. We crudely proceeded to bash up porcelain, glass, brick and other bits mixed it with cement and poured the terrazzo creating what was to be our first Reazzo™ floor. It was stunning.

The mixture of the invention is an environmentally positive replacement for epoxy Terrazzo that is at the same time less costly and 10× faster to apply.

By replacing epoxy with a cementitious product that uses natural, recycled and waste products to displace up to 50% of the cement content, we can retain the physical properties of epoxy, yet reduce the cost and make it portable and pumpable.

This change also had positive effects on the environment as cement production is the World's 3rd largest contributor of $CO_2$, not to mention the copious amounts of energy the process consumes. When you consider that cement is the most used substance on the earth after water, the negative magnitude on the environment becomes obvious.

Epoxy is a petrochemical based substance that potentially has negative health issues as a result of the presence of BPA which can have a potentially hazardous effect on Indoor Air Quality.

The mixture of the invention is handled like a concrete topping. It is premixed and delivered to site in cement truck, unloaded into a concrete pump and pumped into place. The self-levelling properties require very little manipulation to create a flat smooth floor. We have adapted technology used in fibre reinforced concrete that allowed us to do away with the terrazzo divider bars further decreasing installation times. We can anticipate that for example the entire procedure of preparing, priming and placing the mixture at a site can be done at the rate of 10,000 square feet per day. Furthermore, the mixture will be machine ready for grinding, polishing and grouting in 16 hours.

The scope of the claims should not be limited by the preferred embodiments set forth in the examples but should be given the broadest interpretation consistent with the description as a whole.

The invention claimed is:

1. A method of applying a decorative concrete topping to a subfloor comprising:
   preparing a binder composition comprising: about 25-90% (w/w) Portland cement; and about 10-75% (w/w) pozzolanic materials;
   adding to the binder composition:
   (i) a decorative aggregate added at about 50-85% (w/w) of the binder, said decorative aggregate comprising coarse grind aggregate, where the approximate diameter of at least some of the coarse grind aggregate is about half an inch;
   (ii) a high range water reducing additive at about 0.5-5% (w/w) of the binder;
   (iii) a hydration stabilizer at about 0.01-0.1% (w/w) of the binder;
   (iv) a shrinkage reducer at about 0.1-7.5% (w/w) of the binder; and
   (v) fiber at about 0.1-2.0% (w/w) of the binder; and
   mixing the concrete topping mixture;
   preparing a subfloor for installation of the decorative concrete topping;
   pumping the concrete topping mixture onto the subfloor so that the concrete topping mixture is applied to the subfloor at a thickness of at least half an inch; and
   allowing the concrete topping mixture to cure, thereby producing a decorative concrete topping.

2. The method according to claim 1 wherein the pozzolanic materials are selected from the group consisting of: fly ash type F, fly ash type C, biomass ash, silica fume, ground powder glass, slag, metakaolin, calcinated clays, nanosilica, nano-$CaCO_3$, nano-metakaolin and mixtures thereof.

3. The method according to claim 2 wherein the binder comprises about 25-90% (w/w) Portland cement, about 0.1-60% metakaolin and about 9.9-74.9% other pozzolanic materials.

4. The method according to claim 1 wherein the fibers are selected from the group consisting of biofibers; cellulose fibers; glass fibers; synthetic fibers; and combinations thereof.

5. The method according to claim 4 wherein the biofibers are selected from the group consisting of hemp, flax, straw, flax shive and flax mulch.

6. The method according to claim 4 wherein the synthetic fibers are selected from the group consisting of: acrylic fibers, aramid fibers, carbon fibers, nylon fibers, polyester fibers, polyethylene fibers, polyvinyl alcohol fibers, fiber reinforced polymers, and recycled fibers.

7. The method according to claim 1 wherein the shrinking reducing additive is selected from the group consisting of: a long chain fatty acid derivative, a petroleum derivative, a crystalline hydrophilic polymer, a nano-particle filler and mixtures thereof.

8. The method according to claim 1 wherein the hydration stabilizer is selected from the group consisting of: polyoxyalkylen alkyl ether, propylene glycol, a carboxylic acid, a phosphorus-containing acid salt and mixtures thereof.

9. The method according to claim 1 wherein the subfloor is in a location where ambient temperature is between 5 C and 35 C (42 F and 95 F) for at least 48 hours prior to installation of the decorative concrete topping.

10. The method according to claim 1 wherein the subfloor is prepared by priming the subfloor.

11. The method according to claim 10 wherein the subfloor is primed by applying a suitable bonding agent to the subfloor.

12. The method according to claim 1 wherein a majority of the decorative aggregate particles have a diameter of approximately a half inch.

13. The method according to claim 1 wherein at least some of the coarse grind aggregate is of the same approximate diameter as the thickness of the decorative concrete topping.

14. The method according to claim 1 wherein the concrete topping mixture has a working time of 3-8 hours.

15. A method of preparing a decorative concrete topping comprising:
    preparing a binder composition comprising: about 25-90% (w/w) Portland cement; and about 10-75% (w/w) pozzolanic materials;
    adding to the binder composition:
    (i) a decorative aggregate added at about 50-85% (w/w) of the binder, said decorative aggregate comprising coarse grind aggregate, where the approximate diameter of at least some of the coarse grind aggregate is about half an inch;
    (ii) a high range water reducing additive at about 0.5-5% (w/w) of the binder;
    (iii) a hydration stabilizer at about 0.01-0.1% (w/w) of the binder;
    (iv) a shrinkage reducer at about 0.1-7.5% (w/w) of the binder; and
    (v) fiber at about 0.1-2.0% (w/w) of the binder.

16. The method according to claim 15 wherein the pozzolanic materials are selected from the group consisting of: fly ash type F, fly ash type C, biomass ash, silica fume, ground powder glass, slag, metakaolin, calcinated clays, nanosilica, nano-CaCO3, nano-metakaolin and mixtures thereof.

17. The method according to claim 16 wherein the binder comprises about 25-90% (w/w) Portland cement, about 0.1-60% metakaolin and about 9.9-74.9% other pozzolanic materials.

18. The method according to claim 15 wherein the fibers are selected from the group consisting of biofibers; cellulose fibers; glass fibers; synthetic fibers; and combinations thereof.

19. The method according to claim 18 wherein the biofibers are selected from the group consisting of hemp, flax, straw, flax shive and flax mulch.

20. The method according to claim 18 wherein the synthetic fibers are selected from the group consisting of: acrylic fibers, aramid fibers, carbon fibers, nylon fibers, polyester fibers, polyethylene fibers, polyvinyl alcohol fibers, fiber reinforced polymers, and recycled fibers.

21. The method according to claim 15 wherein the shrinking reducing additive is selected from the group consisting of: a long chain fatty acid derivative, a petroleum derivative, a crystalline hydrophilic polymer, a nano-particle filler and mixtures thereof.

22. The method according to claim 15 wherein the hydration stabilizer is selected from the group consisting of: polyoxyalkylen alkyl ether, propylene glycol, a carboxylic acid, a phosphorus-containing acid salt and mixtures thereof.

23. The method according to claim 15 wherein the decorative concrete topping mixture has a working time of 3-8 hours.

* * * * *